June 26, 1934. O. C. GILMORE 1,964,257
APPARATUS FOR COLORING FILMS
Original Filed March 14, 1929
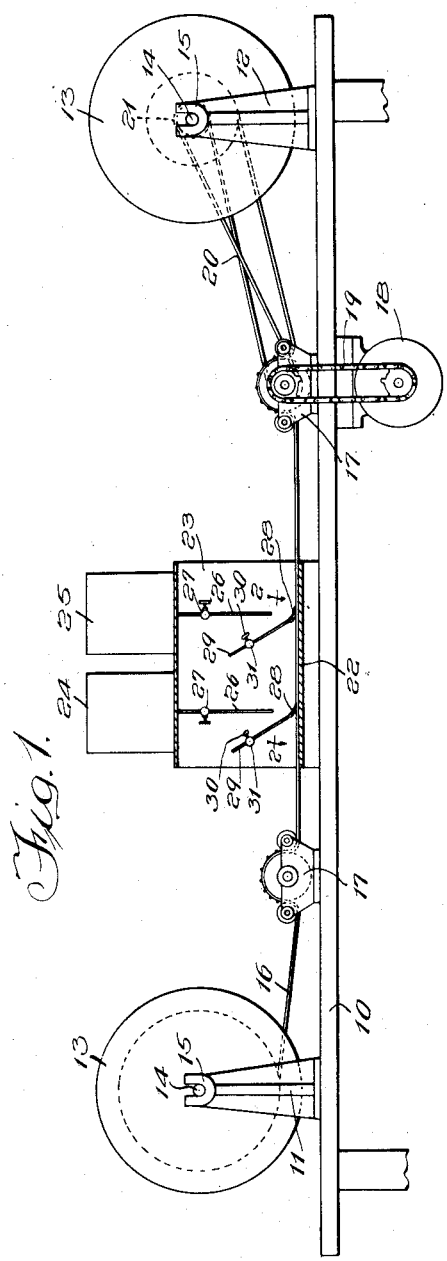
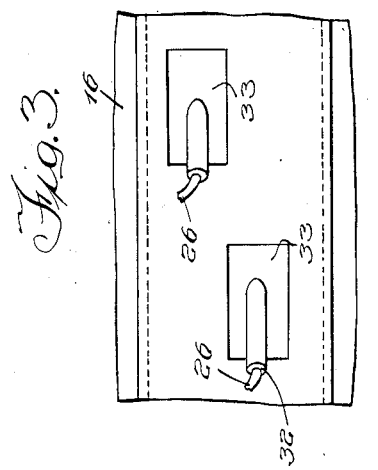
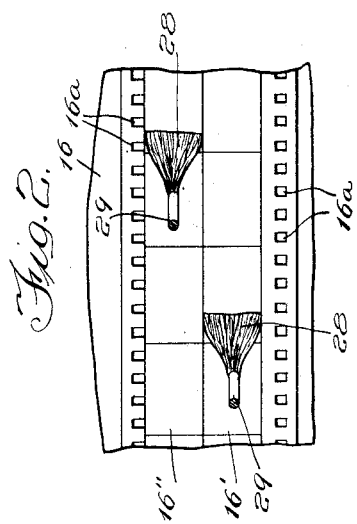
Witness:
William P. Kilroy
Inventor:
Otto C. Gilmore
By Charles D. Nielson
Atty.

Patented June 26, 1934

1,964,257

UNITED STATES PATENT OFFICE 1,964,257

APPARATUS FOR COLORING FILMS

Otto C. Gilmore, Los Angeles, Calif., assignor, by mesne assignments, to Cinemacolor Corporation, Chicago, Ill., a corporation of Delaware Application March 14, 1929, Serial No. 346,867
Renewed November 17, 1933

6 Claims. (Cl. 95—94)

This invention relates to apparatus for coloring films and is particularly adapted to so color the films that the color thereon is a substitute for light filters heretofore used in the projection of color motion pictures.

It has for its object the dyeing of the film with an even, controlled color whereby a sharper image and a more balanced color is produced and color filters may be eliminated.

With the above and other objects in view, as will be apparent, this invention consists in the construction, combination and arrangement of parts, all as hereinafter more fully described, claimed and illustrated in the accompanying drawing, wherein:

Fig. 1 is a side elevation, partly in section, of apparatus embodying the present invention;

Fig. 2 is a plan view of a section of film illustrating the application of color or dye to the film by the apparatus forming the subject matter hereof, by means of brushes or wicks, the same being a section taken along line 2—2 of Fig. 1; and Fig. 3 is a similar view illustrating the use of sprays for applying the coloring matter or dye to the film.

In the manufacture and projection of color motion pictures, the positive film embodies two or more separate and distinct color records, that, if desired, may be one or more lengths of film and which are projected by light upon a screen and there blended to produce a single image. The images from each color record are projected through a light filter corresponding in color to the color record projected therethrough. These light filters are customarily positioned in the path of light and have usually no connection with the film being projected.

The present invention is particularly designed for use in conjunction with a positive film, which includes both color records on a single width and length of standard motion picture film. In the form of film illustrated in the drawing, the color records are arranged side by side on the film so that one row of images represents one color record and the adjoining duplicate row of images represents another color record. By coloring the film to correspond with the color record thereon as, for instance, one longitudinal half of the film being colored blue-green and the opposite longitudinal half being colored red-orange to correspond with the color records appearing in these respective longitudinal halves of the film, the use of filters in the path of light is eliminated, each individual color record of the positive film carrying its own filter as a part of the film.

The present invention is designed to color the longitudinal halves of the film in colors corresponding to the color records upon the corresponding longitudinal halves, while the film is continuously passing a given point and during the continuous movement thereof. Of course, if more than two color records extend longitudinally throughout the film, the width of each record is probably reduced or that of the film increased, and the present apparatus may be readily adapted to produce any desired number of colored strips extending longitudinally of the film.

Reference being had more particularly to the drawing, 10 indicates a platform or frame at the ends of which are the reel supporting pedestals or brackets 11 and 12. Reels or spools 13 are mounted on these brackets or pedestals 11 and 12 by means of the shafts 14 seated in suitable bearings 15 at the tops of the pedestals or brackets. The film 16 is designed to be continuously fed from the reel 13, supported by the pedestal or bracket 11, to the reel 13 supported or carried by the bracket or pedestal 12, the coloring matter being applied to the body of the film as it passes from one reel 13 to the other. A pair of feeding mechanisms 17 are mounted on the frame or platform 10 to guide and operate the film through the machine. One of these feeding mechanisms 17 is operated by a motor 18 through the medium of a belt 19, and extending from the feeding mechanism 17 to a pulley 21 on the shaft of the reel 13 carried by the bracket or bearing 12, is a belt 20, which also drives the reel or spool 13 operating on the pedestal or bracket 12. The operation of the motor 18 by driving one feeding mechanism 17 and from it one of the reels 13, removes the film from the reel 13 carried by the pedestal or bracket 11 and winds it on the reel 13 carried by the pedestal or bracket 12.

The two feeding mechanisms 17 position the central portion of the film in a position approximately parallel to the platform or frame 10 of the apparatus, and maintains it on or adjacent to the floor 22 of an open ended cabinet 23, carried by the platform or frame of the machine 10, centrally between the two feeding mechanisms 17, so that the film 16 operates and passes longitudinally through the cabinet 23, adjacent to or upon the bottom 22 thereof. The bottom 22 of the cabinet 23 acts as a table and support for the film during the coloring operation.

The open ended cabinet 23 carries a pair of reservoirs 24 and 25, which are designed to contain the dyes or colors with which the film is to be treated. A suitable outlet 26 is provided for each reservoir 24—25, and, while the type of outlets or feeding apparatus may vary over quite a range of equivalents, they are illustrated as pipes or tubes 26, provided with regulating valves 27. The flow of the dye or coloring matter from each reservoir 24—25 is regulated by the valve 27, and it will be observed from Fig. 1 of the drawing that the tubes or pipes 26 terminate adjoining the bottom 22 of the cabinet 23. Cooperating with each pipe or outlet 26, is a brush or wick 28 supported by an arm 29. These arms 29 are adjustably secured by the set screws 30 on rods 31, arranged transversely of the cabinet 23. By reference to Fig. 2 of the drawing, it will be seen that the brushes or wicks 28 are each of a width to occupy the full width of one of the color records 16' and 16" between the perforations 16ª along the edges of the film. If the film has a sound path the brushes or wicks 28 do not color this path but are limited in their width to operate upon the longitudinal paths or strips of images, or, in other words, upon a single row of images constituting a single color record. The dyes or coloring matter from the reservoirs 24—25 are fed by the pipes 26 to the brushes or wicks 28 and by the brushes are placed upon the film in an even, smooth, balanced coating. It is obvious that, should more than two color records be present on the film, the number of reservoirs 24—25 and brushes or wicks 28 may be increased and arranged accordingly. Reversely, if only one colored strip is desired, or if it is wished to color the whole film with a single color, only one reservoir and brush or wick is used.

Assuming that the reservoir 24 contains a red-orange coloring matter, and that the reservoir 25 contains a blue-green coloring matter, the brushes or wicks 28 cooperating with these reservoirs will deliver these respective colors to the proper longitudinal halves of the film. That is to say, that between the perforations 16ª and along one longitudinal half of the film the red-orange dye or coloring matter will be applied, while from the center of the film to the opposite line of perforations 16ª, the blue-green dye or coloring matter will be applied, of course, leaving the sound path of the film clear of any coloring matter.

In Fig. 3 is illustrated a modified form of the apparatus for applying the dye or coloring matter to the film. In this form of the apparatus, suitable spraying mechanisms 32 are used to place the dye or coloring matter upon the film, said spraying mechanisms being connected to the pipes 26 to receive the dyes or coloring matter from the reservoirs 24—25. A housing 33 encases or encloses each spraying mechanism 32 and operates over the portion of the film that the spraying mechanism is designed to operate upon, so that one longitudinal half of the film will be supplied by one spraying mechanism 32 and the other longitudinal half of the film will be supplied by the other spraying mechanism 32. The housings 33 prevent the respective spraying mechanisms from operating upon any portion of the film 16, other than the longitudinal half thereof which corresponds to the color being emitted by that particular spraying apparatus.

From the foregoing it is apparent that the present apparatus provides a continuously operating mechanism by means of which the film is fed from one reel 13 to the other reel 13 and has longitudinal strips of color placed thereon during such passage. That is to say, each longtiudinal half of the film is colored independently of the other longitudinal half of the film, whereby the color filters required for the projection of color motion pictures are placed directly upon the film. It is also apparent that the present apparatus may be modified to dye or color the entire width of the film a single color, without departing from the spirit or scope hereof.

What is claimed is:

1. In a film coloring apparatus, a combination with a table, of reels co-acting therewith for passing film across said table in a single longitudinal plane, and means cooperating with said table for coloring continuous longitudinal sections of said film.

2. In a film coloring apparatus, a combination with a table, of reels co-acting therewith for passing film across said table in a single longitudinal plane, and means cooperating with said table for coloring continuous longitudinal sections of said film, comprising independent color applicators, and means for supplying coloring fluids to said applicators.

3. In a film coloring apparatus, a combination with a table, of reels co-acting therewith for passing film across said table in a single longitudinal plane, and means cooperating with said table for coloring continuous longitudinal sections of said film, comprising an applicator co-acting with each longitudinal section of the film to be colored, and means for gradually supplying coloring fluid to said applicator.

4. In a device for simultaneously coloring continuous longitudinal sections of the film, the combination with a table, of means for continuously passing the film across said table in a single longitudinal plane, a support disposed above said table, applicators mounted within said support, each applicator being designed to act upon an independent longitudinal section of film, and means for delivering coloring fluid to said applicator.

5. In a device for coloring continuous longitudinal sections of film, the combination with a table, of means for continuously passing the film across said table in a single longitudinal plane, a support disposed above said table, brushes adjustably mounted upon said support and co-acting with independent longitudinal sections of the film, and means for delivering coloring fluid to said brushes.

6. In a device for coloring continuous longitudinal sections of film, the combination with a table, of means for continuously passing the film across said table in a single longitudinal plane, a support disposed above said table, brushes adjustably mounted upon said support and co-acting with independent longitudinal sections of the film, and means for delivering coloring fluid to said brushes, including tanks having delivery pipes adjoining the brushes aforesaid, and each pipe having a valve therein for regulating the flow of fluid.

OTTO C. GILMORE.